United States Patent
Chirol et al.

(10) Patent No.: US 11,219,925 B2
(45) Date of Patent: *Jan. 11, 2022

(54) SHARING OF PARCEL SORTER OUTLETS

(71) Applicant: SOLYSTIC, Bagneux (FR)

(72) Inventors: Luc Chirol, Paris (FR); Bruno Volta, Gif sur Yvette (FR)

(73) Assignee: SOLYSTIC, Bagneux (FR)

( * ) Notice: Subject to any disclaimer, the term of this patent is extended or adjusted under 35 U.S.C. 154(b) by 21 days.

This patent is subject to a terminal disclaimer.

(21) Appl. No.: 16/841,942

(22) Filed: Apr. 7, 2020

(65) Prior Publication Data

US 2020/0324321 A1 Oct. 15, 2020

(30) Foreign Application Priority Data

Apr. 10, 2019 (FR) ...................................... 1903821

(51) Int. Cl.
  *B65G 47/38* (2006.01)
  *B07C 5/36* (2006.01)
  *B07C 3/08* (2006.01)
  *B65G 47/71* (2006.01)

(52) U.S. Cl.
  CPC ............... *B07C 3/08* (2013.01); *B65G 47/71* (2013.01)

(58) Field of Classification Search
  CPC .. B07C 3/08; B07C 5/36; B65G 47/71; B65G 47/68; B65G 47/683; B65G 47/38
  USPC ....................................................... 209/707
  See application file for complete search history.

(56) References Cited

U.S. PATENT DOCUMENTS

| 8,386,071 B2* | 2/2013 | Baccini | B65G 47/53 700/223 |
| 8,919,529 B1 | 12/2014 | Erceg et al. | |
| 11,033,935 B2* | 6/2021 | Czukor | B65G 65/005 |
| 2021/0009362 A1* | 1/2021 | Grupp | B07C 5/36 |

FOREIGN PATENT DOCUMENTS

| DE | 19757963 A1 | 7/1999 |
| WO | 2005/025764 A1 | 3/2005 |

OTHER PUBLICATIONS

French Search Report dated Feb. 5, 2020 issued by INPI from corresponding Application No. FR 1903821, 1 page.

* cited by examiner

*Primary Examiner* — Michael McCullough
*Assistant Examiner* — Molly K Devine
(74) *Attorney, Agent, or Firm* — Ware, Fressola, Maguire & Barber LLP

(57) ABSTRACT

A parcel-sorting facility for sorting parcels (115) comprises a conveyor (110) and receptacles (118) situated at sorting outlets (117) and corresponding to destination addresses of the parcels. Each sorting outlet is shared between a plurality of receptacles, only one of which is in a position (P0) for receiving parcels. A receptacle exchanger device (119) for exchanging receptacles is assigned to each outlet, and is configured for exchanging the receptacle in the receiving position at a given outlet with another of the receptacles sharing the outlet, and the sorting facility anticipates the arrival of a parcel at the outlet by placing the receptacle associated with the destination of this parcel in the receiving position whenever necessary.

6 Claims, 2 Drawing Sheets

SHARING OF PARCEL SORTER OUTLETS

CROSS REFERENCE TO RELATED APPLICATIONS

This application claims priority under 35 USC § 119 to French Patent Application No. 1903821 filed on Apr. 10, 2019, which is hereby incorporated by reference in its entirety.

TECHNICAL FIELD

The invention relates to the field of parcel-sorting systems.

PRIOR ART

In order to receive parcels coming from various sources and in order to deliver them to a large number of recipients, sorting centers are equipped with automated parcel-sorting systems.

As disclosed in Patent Application WO 2018/115608 and in Patent U.S. Pat. No. 8,919,529 B1, an automated parcel-sorting facility may comprise a conveyor on which parcels to be sorted are conveyed under the control of a monitoring and control unit towards receptacles that are situated at sorting outlets and that correspond to destination addresses of said parcels, the sorting outlets being distributed along the conveyor.

Patent U.S. Pat. No. 8,919,529 B1 also discloses that each sorting outlet is shared between two receptacles, only one of which is in a position for receiving parcels.

With the current increase in the volume of online or mail-order purchases by private individuals, in particular via Internet platforms, and thus with the parallel increase in delivery volumes to a large number of recipients, postal operators or parcel delivery operators in general are faced with having to sort and handle a very large number of small parcels addressed to a large number of delivery addresses.

In order to meet these needs, merely increasing the sizes and the numbers of conventional sorting outlets comes up against obstacles constituted by footprint, i.e. how much floor area they occupy, by handling of the receptacles at the outlets, and by cost.

SUMMARY OF THE INVENTION

An object of the present invention is to provide a sorting facility that contributes to solving the above-mentioned problems, and that is based, in particular, on the principle of sharing the sorting outlets between a plurality of destinations.

To this end, the invention provides a parcel-sorting facility comprising a conveyor on which parcels to be sorted are conveyed, under the control of a monitoring and control unit, towards receptacles situated at sorting outlets and corresponding to destination addresses of said parcels, the sorting outlets being distributed along the conveyor, in which facility each sorting outlet is shared between a plurality of receptacles, only one of which is in a parcel-receiving position, said parcel-sorting facility being characterized in that a receptacle exchanger device for exchanging receptacles is assigned to each outlet, and is configured for exchanging that one of the receptacles that is in the receiving position at a given outlet with another of the receptacles sharing said outlet, and in that the parcel-sorting facility anticipates the arrival of a parcel at said outlet by means of the monitoring and control unit that determines which receptacle from among the receptacles assigned to said outlet is associated with a destination of the parcel and which receptacle is a current receptacle placed in the receiving position of said outlet, that tests whether the receptacle associated with the destination of the parcel is the current receptacle, and, that responds to the test producing a negative result by ordering the exchanger device assigned to the outlet to place the receptacle associated with the destination of the parcel in the receiving position in place of the current receptacle.

By sharing the sorting outlets between a plurality of addresses and a plurality of receptacles associated with said addresses, the sorting facility of the invention increases the number of actual physical destinations, each corresponding to an address or to a batch of addresses, for a fixed number of physical outlets, each corresponding to a sorting outlet of the conveyor.

If, for example, a given sorting outlet is shared between four receptacles, each associated with one or more destination addresses of the sorted parcels, there will then be four times more actual destinations than there are physical outlets of the conveyor, which physical outlets are the ones that have direct impacts on the footprint and on the volume of the fixed infrastructure constituting the parcel-sorting facility.

In this example, and to a first approximation, the sorting facility of the invention can serve four times more destination addresses for a footprint equivalent to the footprint of a conventional sorting facility.

The parcel-sorting facility of the invention may advantageously have the following features:

the conveyor is a looped conveyor;

for each outlet, nesting trolleys, each of which carries one of the receptacles, are situated under the sorting outlets, and the receptacle exchanger devices are configured in such a manner as to move the nesting trolleys selectively so as to put said receptacles in the receiving positions for receiving parcels from the corresponding outlets on being controlled by the monitoring and control unit; and nesting trolleys assigned to a same sorting outlet are placed on either side of the conveyor at said same outlet.

BRIEF DESCRIPTION OF THE DRAWINGS

The present invention will be better understood and other advantages will appear on reading the following detailed description of embodiments given by way of non-limiting example and with reference to the accompanying drawings, in which.

DESCRIPTION OF AN EMBODIMENT

An embodiment of the invention is described with reference to FIGS. 1A to 2F and consists of a parcel-sorting facility for sorting parcels arriving at a sorting center such as a logistics center for receiving parcels and for re-dispatching them.

Figure 1A:
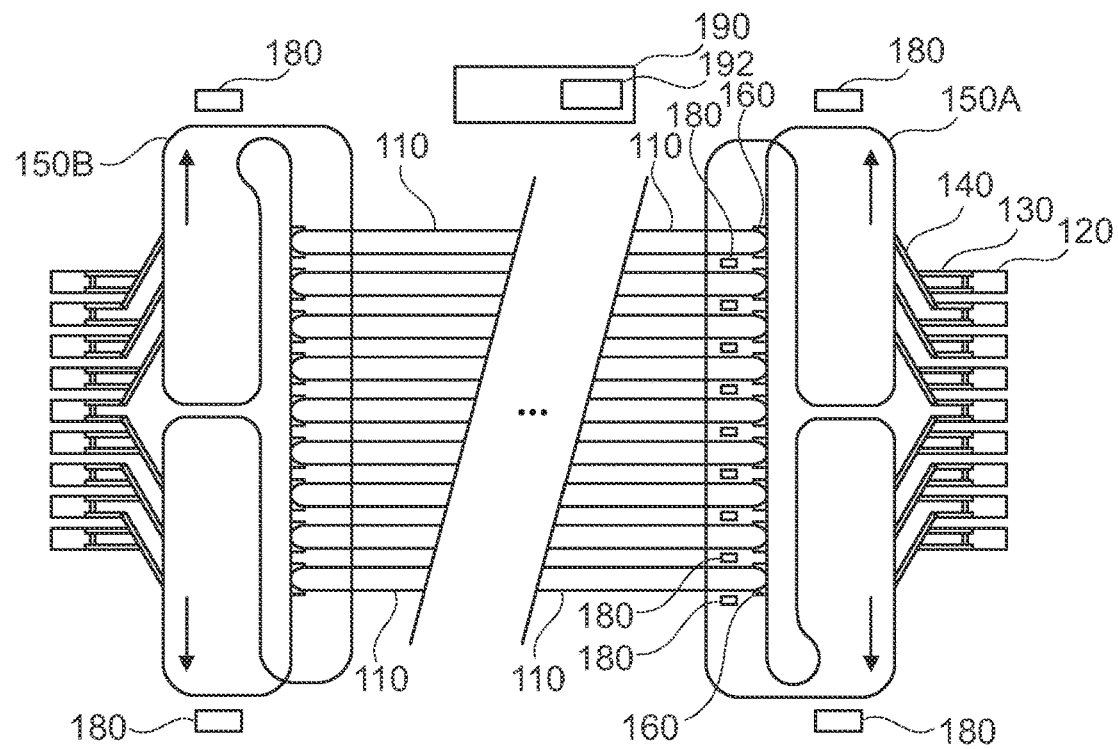
FIG. 1A is a diagrammatic plan view of a particular implementation of a sorting facility of the invention.

FIG. 1A is a diagrammatic plan view of this embodiment of the sorting facility, with container-overturning stations 120 that tip out the parcels arriving in containers loosely onto first conveyors 130, on which said parcels are singulated.

Downstream from the conveyors 130, second conveyors 140 transfer the parcels to one of two high throughput rate looped conveyors 150A and 150B that face each other.

Looped conveyors 110 installed in parallel with one other receive the parcels transported by the high throughput rate conveyors 150A and 150B via transfer stations 160.

Figure 1B:
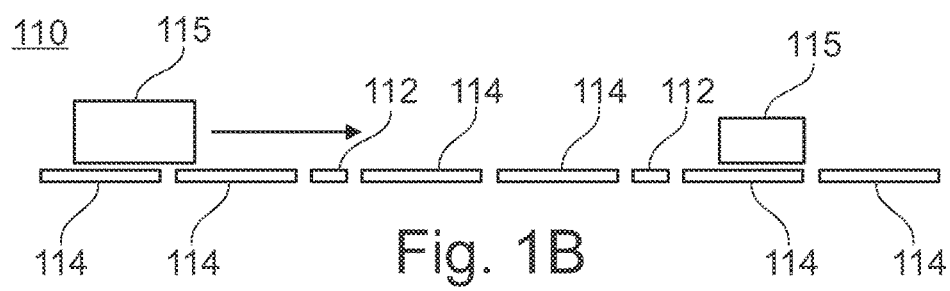
FIGS. 1B and 1C are side views of the facility of FIG. 1A at a looped conveyor.
Figure 1C:
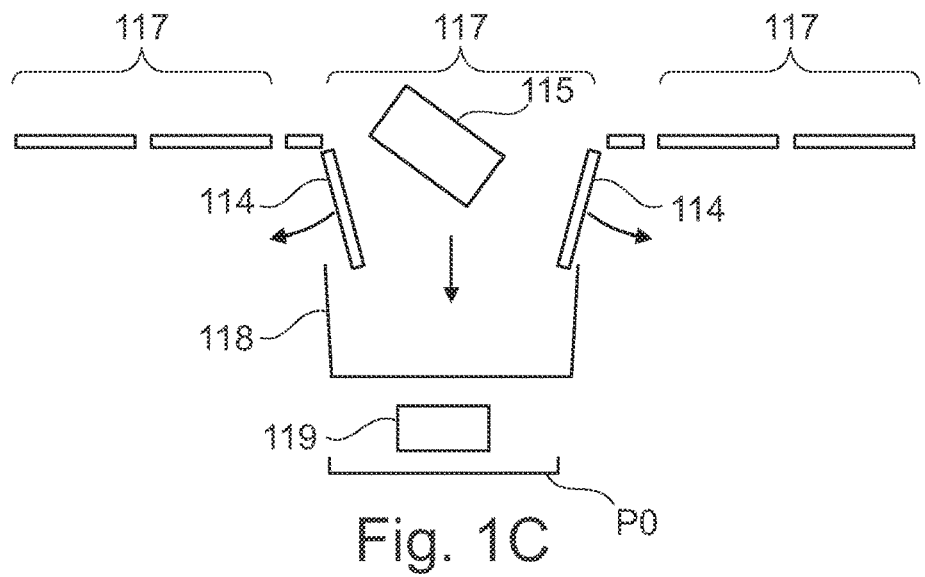

FIGS. 1B and 1C each show a portion of the structure of each of the looped conveyors 110 as seen from the side, with a succession of conveying elements 112 and 114 on which the parcels 115 being moved rest, each pair of elements 114 being constituted by two flaps that are mounted to pivot in opposite directions in such a manner as to form a sorting outlet 117 via which the parcels 115 to be sorted can fall into receptacles 118 as shown in FIG. 1C.

Each sorting outlet is shared between a plurality of receptacles 118, only one of which is in a position P0 for receiving parcels.

In accordance with the invention, a receptacle exchanger device 119 for exchanging receptacles is assigned to each outlet (only one of these devices is shown in FIG. 1C) and is configured for exchanging that one of the receptacles 118 that is in the receiving position P0 at a given outlet with another of the receptacles 118 sharing said outlet and standing by in the immediate vicinity of said outlet.

The elements of the sorting facility, and in particular the looped conveyors 110, the conveying elements 114 and the receptacle exchanger devices 119 are controlled by a monitoring and control unit, which is also capable of identifying and of tracking the movements of the parcels within the sorting facility by using known methods that are based, for example, on the conveying speeds of each of the conveyors 130, 140, 150A, 150B, and 110.

The monitoring and control unit may associate each parcel with a destination address, e.g. by means of identification devices 180 using any method, such as analyzing images of the parcels, reading bar codes on the parcels, or communicating with radiofrequency tags or chips carried by said parcels.

In this particular embodiment, the identification devices 180 are placed along the high throughput rate conveyors 150A and 150B for routing the parcels on the looped conveyors 110 reliably, and, optionally, along said looped conveyors 110, as determined by the skilled practitioner.

The sorting facility is designed in such a manner as to sort a parcel using the following method.

A computer memory 192 of the monitoring and control unit 190 stores the information relating to the parcels such as their identities and destinations, as well as a sorting plan that puts each destination address into correspondence with a sorting outlet and with a receptacle in the sorting facility.

In a step S0, the monitoring and control unit identifies a parcel to be sorted and its destination address by means of an identification device 180, and then, in a step S2, determines the outlet that the parcel should take as well as the receptacle associated with its destination address so as to be directed to said receptacle, in accordance with the stored sorting plan.

In response to this determination, the parcel is directed and tracked within the sorting facility using known methods during a step S4, the sorting facility being configured to anticipate the arrival of the parcel at the outlet determined by means of the monitoring and control unit 190, which, in step S2, determined which receptacle from among the receptacles assigned to said outlet is associated with the destination of the parcel and which also, in a step S6, determines which receptacle 118 is a current receptacle placed in the receiving position P0 for receiving parcels from said outlet, and, in a step S8, tests whether the receptacle associated with the destination of the parcel is in the receiving position P0 of said outlet, and, in response to this test producing a negative N, orders the receptacle exchanger device 119 assigned to said outlet to place the receptacle associated with the destination of the parcel in the receiving position P0 in place of the current receptacle in a step S10, the receptacle that is newly put in place then becoming the new current receptacle.

In response to the test in step S8 producing a positive result Y or following the exchange of receptacles in step S10, the monitoring and control system orders the pair of flaps of the determined outlet to open in order to allow the parcel to fall into the determined receptacle corresponding to its destination address in step S14.

Then, after filling, or after any other criterion determined by the skilled practitioner has been satisfied, the receptacle can be handled with a view to performing the subsequent preparation and/or transport operations.

The method may also include a step S12 that is situated immediately after step S14, and that tests whether the determined receptacle is actually in place at the time at which the parcel comes level with the outlet, and, if the result is negative N, inhibits the opening of the flaps of the step S14 in order to cause the parcel to be recycled, i.e. to go round again, on the looped conveyor 110, thereby looping the method of processing the parcel back to upstream of step S4.

The advantage of this recycling procedure is to increase the robustness of the system, e.g. so as to overcome the momentary absence of a receptacle assigned to a certain address or to a certain batch of destination addresses; such a situation may arise while a full receptacle is being replaced with an empty receptacle.

Thus, looped conveyors are preferably used, but implementation of the invention is not limited to this type of conveyor and it remains possible to use conveyors other than looped conveyors.

FIGS. 2B to 2F show the specificities of the present embodiment.

In this embodiment, the receptacles 118 are trays or bins, and mobile and nesting trolleys 210 mounted on small wheels or casters 211 and each carrying a respective one of the receptacles 118 are located under the sorting outlets, each outlet along a looped conveyor 110 corresponding to positions P0, P1, and P2.

Figure 2A:
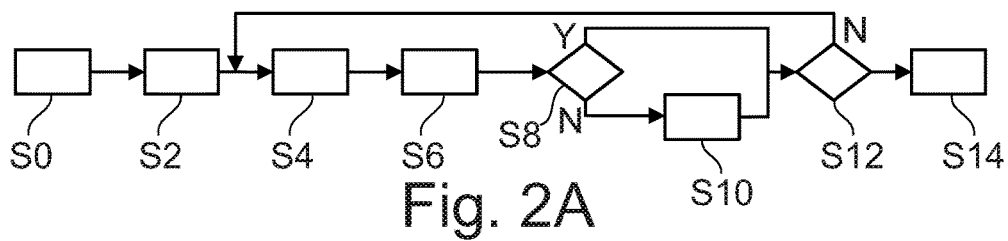
FIG. 2A is a flow chart summarizing how the facility of FIG. 1A operates.
Figure 2B:
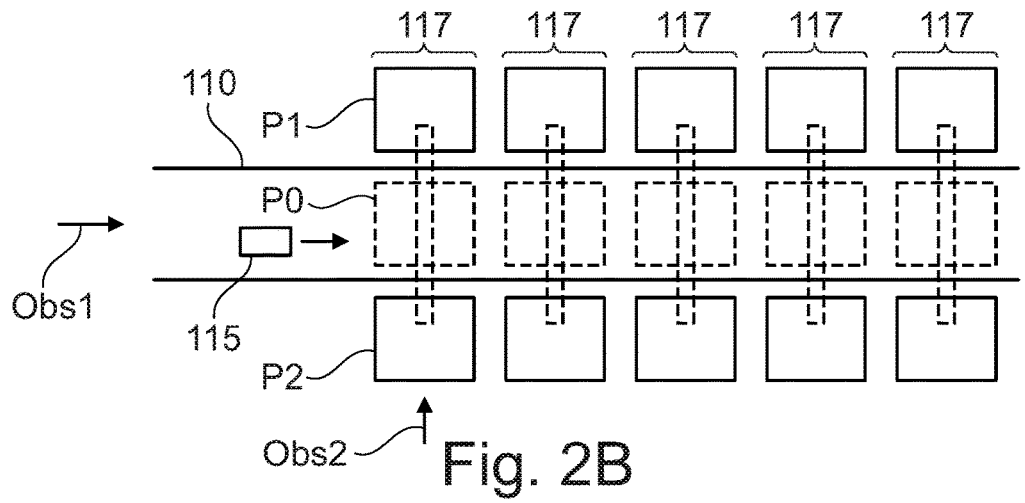
FIGS. 2B to 2F show details at a looped conveyor of an embodiment of the invention.
Figure 2C:
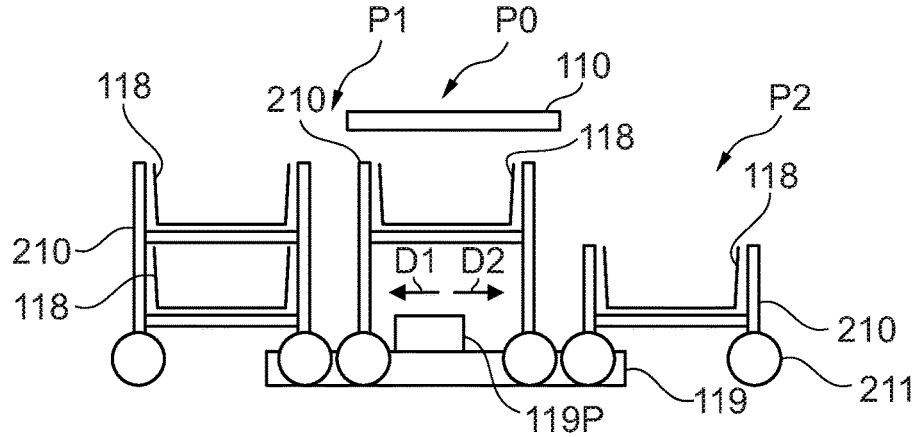

FIG. 2C is thus a section view of the looped conveyor 110 at a sorting outlet seen in the observation horizontal direction Obs1 of FIG. 2B, which shows a portion of the conveyor 110 seen from above, with the nesting trolleys 210, the trays 118 and the receptacle exchanger device 119, the positions P1 and P2 being situated on either side of the conveyor and flanking the position P0 situated directly under an outlet chute 117 of the conveyor.

The relative positioning of the positions P0, P1, and P2 makes it possible to optimize the use of the space, with an increase in density of the receptacles: for each outlet, a receptacle exchanger device 119 extends in a direction that is transverse to the conveyor at the outlet in question, and a plurality of nesting trolleys are placed at said outlet in positions P0, P1, and P2.

In this example, the receptacle exchanger devices 119 are fastened under respective ones of the outlets of the conveyor and they are configured in such a manner as to move the nesting trolleys selectively between the receiving positions P0 and respective ones of the standby positions P1 or P2 so that, on being controlled by the monitoring and control unit 190, they put the receptacles they are carrying into the receiving positions P0 for receiving parcels from the corresponding outlet or remove the trolleys from said receiving positions P0, by means of the moving grasping arrangement 119P that is capable of taking hold of and of releasing the nesting trolleys 210 and of moving in two opposite directions indicated by arrows D1 and D2.

Figure 2D:
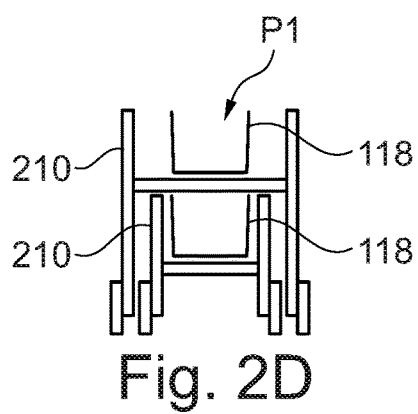
Figure 2E:
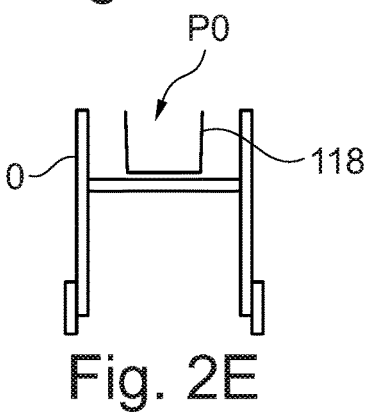
Figure 2F:
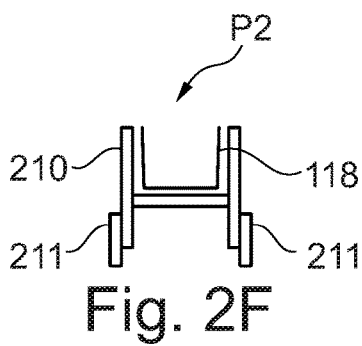

FIGS. 2D to 2F show the three positions P0, P1 and P2 of FIG. 2C as seen in the observation direction Obs2 of FIG. 2B.

FIG. 2D shows the capacity that the nesting trolleys have for being stowed one under another with their respective loads, and thus for optimizing use of the space, with, in this example, two nesting trolleys carrying receptacles in the same standby position P1.

FIGS. 2E and 2F respectively show a nesting trolley with its receptacle being carried at a high level in the parcel-receiving position P0, and a nesting trolley with its receptacle being carried at a low level in the standby position P2, it being possible for these two nesting trolleys to take up the same position P2 simultaneously when, for example, one of the nesting trolleys from the position P1 is to be placed in the position P0.

Thus, the exchange or "swap-over" between two receptacles at the parcel-receiving position P0 preferably takes place by bringing the current receptacle, i.e. the receptacle in the parcel-receiving position, back to its standby position P1 or P2, and then by taking the receptacle selected by the monitoring and control unit for receiving a parcel arriving at the outlet and moving it from its standby position P1 or P2 to its parcel-receiving position P0, in which it becomes the new current receptacle.

Changing the current receptacle of a sorting outlet dynamically, as a function of the parcels to be sorted that arrive at that outlet offers several advantages.

In practice, while sorting parcels as a function of their destination addresses, it is observed that few parcels are addressed to certain addresses, and the receptacles associated with such addresses are therefore little used.

Conventionally, a receptacle, even one that is little used, remains static under an outlet and therefore monopolizes that outlet which is thus also little used, thereby maintaining some fraction of the sorting facility in a situation of under-use.

In accordance with the invention, a plurality of receptacles share one outlet, only one receptacle being a current receiving receptacle in the receiving position, i.e. in a position for receiving the parcels taking that outlet, the other receptacles being in standby positions.

Thus, unlike in the conventional situation, a little-used receptacle does not monopolize a physical outlet, and a receptacle occupies the receiving position in proportion to the number of parcels it receives, which number, per se, makes it possible to increase the rate of use of the facility, with positive impacts on footprint, costs, and return on investment for a given capacity of the sorting facility.

Furthermore, the reduction in the number of (stationary) physical outlets for a given number of logical outlets (the mobile receptacles) facilitates the logistics of handling the receptacles at the sorting outlets.

What is claimed is:

1. A parcel-sorting facility comprising a conveyor on which parcels to be sorted are conveyed, under the control of a monitoring and control unit, towards receptacles situated at sorting outlets and corresponding to destination addresses of said parcels, the sorting outlets being distributed along the conveyor, in which each sorting outlet is shared between a plurality of receptacles, only one of which is in a parcel-receiving position, said parcel-sorting facility further comprising a receptacle exchanger device that is for exchanging receptacles, is assigned to each outlet, and is configured for exchanging one of the receptacles that is in the receiving position at a given outlet with another of the receptacles sharing said outlet, and in that the parcel-sorting facility anticipates the arrival of a parcel at said outlet by means of the monitoring and control unit that determines which receptacle from among the receptacles assigned to said outlet is associated with a destination of the parcel and which receptacle is a current receptacle placed in the receiving position of said outlet, that tests whether the receptacle associated with the destination of the parcel is the current receptacle, and, that responds to the test producing a negative result by ordering the exchanger device assigned to the outlet to place the receptacle associated with the destination of the parcel in the receiving position in place of the current receptacle.

2. The parcel-sorting facility according to claim 1, wherein the conveyor is a looped conveyor.

3. The parcel-sorting facility according to claim 2, wherein, for each outlet, nesting trolleys, each of which carries one of the receptacles, are situated under the sorting outlets, and in that the receptacle exchanger devices are configured in such a manner as to move the nesting trolleys selectively so as to put said receptacles in the receiving positions for receiving parcels from the corresponding outlets, the receptacle exchanger devices are controlled by the monitoring and control unit.

4. The parcel-sorting facility according to claim 3, wherein nesting trolleys assigned to a same sorting outlet are placed on either side of the conveyor at said same outlet.

5. The parcel-sorting facility according to claim 1, wherein, for each outlet, nesting trolleys, each of which carries one of the receptacles, are situated under the sorting outlets, and in that the receptacle exchanger devices are configured in such a manner as to move the nesting trolleys selectively so as to put said receptacles in the receiving positions for receiving parcels from the corresponding outlets, the receptacle exchanger devices are controlled by the monitoring and control unit.

6. The parcel-sorting facility according to claim 5, wherein nesting trolleys assigned to a same sorting outlet are placed on either side of the conveyor at said same outlet.

* * * * *